(12) United States Patent
Bosua (10) Patent No.: US 9,144,810 B2
(45) Date of Patent: Sep. 29, 2015

(54) ATOMIZING NOZZLE ASSEMBLY FOR PNEUMATICALLY OPERATED CLEANING EQUIPMENT

(75) Inventor: Christopher John Bosua, Davenport, FL (US)

(73) Assignees: Christopher John Bosua, Davenport, FL (US); John Mesiti, Sydney, NSW (AU)

( * ) Notice: Subject to any disclaimer, the term of this patent is extended or adjusted under 35 U.S.C. 154(b) by 383 days.

(21) Appl. No.: 13/541,730

(22) Filed: Jul. 4, 2012

(65) Prior Publication Data

US 2014/0008457 A1   Jan. 9, 2014

(51) Int. Cl.
| | |
|---|---|
| B05B 3/04 | (2006.01) |
| B05B 3/06 | (2006.01) |
| B05B 15/02 | (2006.01) |
| B05B 3/16 | (2006.01) |
| B05B 3/02 | (2006.01) |
| B05B 7/24 | (2006.01) |

(52) U.S. Cl.
CPC ... *B05B 3/06* (2013.01); *B05B 3/02* (2013.01); *B05B 3/04* (2013.01); *B05B 3/0418* (2013.01); *B05B 3/0422* (2013.01); *B05B 3/165* (2013.01); *B05B 15/025* (2013.01); *B05B 7/2424* (2013.01); *F16C 2235/00* (2013.01)

(58) Field of Classification Search
CPC .. B05B 3/0418; B05B 3/0422; B05B 15/025; B05B 3/165; B05B 3/02; B05B 3/04; B05B 3/06; B05B 7/2424; F16C 2235/00

USPC ............. 239/104, 106, 112, 113, 225.1, 239/231–233, 237, 240, 251, 380–383
See application file for complete search history.

(56) References Cited

U.S. PATENT DOCUMENTS

| | | | | | |
|---|---|---|---|---|---|
| 2,529,262 | A | * | 11/1950 | Ratliff | 239/240 |
| 7,175,107 | B2 | * | 2/2007 | Amaduzzi | 239/251 |
| 7,546,959 | B2 | * | 6/2009 | Wagner et al. | 239/251 |

FOREIGN PATENT DOCUMENTS

EP   2255885   12/2010

* cited by examiner

*Primary Examiner* — Steven J Ganey
(74) *Attorney, Agent, or Firm* — Kilpatrick Townsend & Stockton LLP (57) ABSTRACT

An atomizing nozzle assembly (1) for pneumatically operated cleaning equipment with a nozzle body (2), in which a nozzle pipe (12) can rotate in bearings, is improved with regard to safe function and long service life to the effect that a disc section (24) of a stop element (23) arranged on the inlet side of the nozzle pipe (12) has a smaller outer diameter (26) than the inner diameter (27) of the inlet end (4) of nozzle housing (2) so that an annular gap (28) remains between disc section (24) and nozzle housing (2) through which compressed air (14) can flow and compressed air (15) passes through two bearings (9, 10) for the rotary nozzle pipe (12) helping to remove dirt from the bearings.

17 Claims, 6 Drawing Sheets

ATOMIZING NOZZLE ASSEMBLY FOR PNEUMATICALLY OPERATED CLEANING EQUIPMENT

The invention covers an atomizing nozzle assembly for pneumatically operated cleaning equipment with a nozzle body comprising a basically tubular housing section with an inlet end with inlet opening to be fastened to the cleaning equipment, ending into a preferably funnel-shaped extension with an outlet section and outlet opening at the opposite side, with a bearing each at the inlet and outlet side at an axial offset to each other for a rotating nozzle pipe having an inlet end where pressurized fluid, in particular compressed air or a mixture of compressed air and fluid droplets, can enter; a main section of the nozzle pipe starting from the inlet end and basically reaching through the bearings in a straight manner followed, in the area of the exit section of the nozzle housing, by an transitory section angled in relation to the axis of rotation of the nozzle pipe, which leads into a nozzle section whose free end features a nozzle opening from which the fluid exits, with the nozzle pipe having a stop element in the area of its inlet end basically having an annular disc section radially protruding to the outside.

Such an atomizing nozzle assembly has been described in EP 2 255 885 A1. It is also used for pneumatically operated cleaning equipment also referred to as cleaning guns, spraying guns or atomizing guns. Such cleaning equipment features a pistol-shaped handle with a compressed air line connected to its lower end. The compressed air can enter a basically tubular intermediate section usually connected to a reservoir for cleaning agent, in particular water; from the upper end of the handle via a valve opened by way of a trigger lever. A fluid pipe connects the reservoir with the intermediate section. Due to the Venturi effect, the compressed air passing at a high speed carries fluid droplets along, thus forming a mist-like mixture of compressed air and cleaning fluid. This mixture reaches an atomizing nozzle assembly featuring a nozzle orifice arranged eccentrically to its rotating axis to be connected to the intermediate section. The eccentrically exiting cleaning fluid causes the nozzle pipe with the nozzle orifice to rotate quickly, causing the cleaning fluid to be heavily whirled and leaving the orifice of the atomizing nozzle assembly in the shape of a whirl. Due to the whirled cleaning fluid, the latter can attack and loosen dirt particles on the object to clean in a particularly efficient manner.

The term "fluid" used in the following shall refer to both compressed air and liquids of all kinds and mist-like mixtures of compressed air and liquids that can also contain small solid objects. The significant point is the whirled fluid exiting from the atomizing nozzle assembly in a helical or spiral manner, thus being suitable for cleaning.

The objective of the invention is to improve an atomizing nozzle assembly as described in the beginning such that its function is ensured optimally and over a long time.

In this invention, the problem is solved as follows: the disc section of the stop element as a smaller outer diameter than the inner diameter of the inlet end of the nozzle housing, forming an annular gap between the disc section and the nozzle housing through which the fluid can flow. The invention has the advantage of not only letting the fluid pass through the nozzle pipe so it exits from the outlet opening in a whirled manner, but also flows via the annular gap first to the inlet side bearing and then to the outlet side bearing whereby it passes through both bearings. This removes dust and dirt in the bearings and improved the service life and function of the bearings. This not only applies to one variant according to the design example described below that features two bearings, but it makes the invention also suitable for atomizing nozzle assemblies with three or more bearings.

A preferred variant of the invention has an annular gap of approx. 2 mm width. Of course, the gap width must match the inner diameter of the nozzle pipe to ensure a sufficient amount of compressed air flows through the nozzle pipe to make it rotate and to obtain the desired cleaning effect. With the dimensions used here, a gap with of 2 mm proved to be optimal.

To ensure optimum function over the longest period possible, the surface of the disc section is also of importance since the surface area of the pressurized surface directly relates to the force with which the disc section pushes against the inlet bearing. Experience with the present invention has shown that the optimal outer diameter of the disc section is approx. 16 mm.

In a simple variant of this invention, the nozzle pipe features a male thread at its inlet end, preferably M5, to which the stop element equipped with a female thread is screwed. This lets you easily screw the stop element to the nozzle pipe.

The inlet end of the nozzle housing can also feature a female thread, preferably M18, for fastening to the cleaning equipment. Fastening is very easy: just screw the atomizing nozzle assembly to the cleaning equipment. When the cleaning equipment has a smaller thread, the atomizing nozzle assembly described in this invention can still be fastened with an adapter, or the female thread of the nozzle housing can be matched to the male thread of the cleaning equipment.

In the embodiment of this invention, the outer races of the two bearings and any other potential bearings of the nozzle pipe have contact with the cylindrical inner wall of the tubular housing section of the nozzle housing. Given this arrangement, the bearings can be preassembled on the nozzle pipe and the preassembled unit inserted into the nozzle housing, whereby it is possible to slide the bearings on their outer races along the cylindrical inner wall until nozzle pipe and bearings have reached their final installation position. Other fastening measures to arrest the bearings in radial direction are not required.

To also arrest the bearings in axial direction in an enhanced version of the invention, the outlet side bearing makes radial contact with an axial shoulder radially protruding into the inner wall of the nozzle housing, a spacer enclosing the nozzle pipe is arranged between inlet side bearing and outlet side bearing, the pressurized fluid forces the stop element against the inlet side bearing while the pressing force is supported by the spacer and the outlet side bearing by the axial stop of the nozzle housing. Said axial shoulder of the nozzle housing can be easily machined during manufacture of the nozzle housing and therefore does not require an additional process step.

When the stop element features additional webs arranged on the disc section in the fluid flow path facing the inlet orifice of the nozzle housing, the rotational speed of the nozzle tube can be changed and optimally matched to the requirements.

In a preferred enhancement of the invention, the blades on the disc section have the same angular distance to each other in the direction of rotation. The blades also have a preferably spiraled shape. In this variant, the disc section and its blades function like a small turbine rotating in the fluid flow path at an easily controllable and relatively constant speed.

Because of the construction, the fluid flow path carries a radial and an axial speed component in the area of the blades. For this reason, a variant is recommended where the blades expand in axial direction with increasing distance from the axis of rotation.

The invention also proposes that the stop element features an axially extending, basically tubular pipe section through which the female thread passes axially extending around the nozzle pipe and axially making contact with the inner race of the inlet side bearing. The inner race of the inlet side bearing rotates with the pipe section with which it makes contact, and with the nozzle pipe. The axial force generated by the compressed air acting upon the disc section of the stop element is transmitted via the pipe section.

To generate the desired whirling, the nozzle pipe must feature an eccentrically bent section. This bend can have various angles on one hand determining the quality of the whirling effect and a vibration of the entire nozzle assembly and consequently of the cleaning equipment caused by the imbalance of the nozzle pipe on the other hand. To obtain the lowest possible vibration with a good whirling effect, a variant proved optimal where the transitory section of the nozzle pipe features an angle of approx. 160° to the axis of rotation of the main section.

To generate a torque acting on the nozzle pipe, it is recommended to have the nozzle section of the nozzle pipe angled in relation to both the transitory section and the axis of rotation.

An optimal stability of the nozzle pipe paired with a good fluid flow rate is obtained when the nozzle pipe has an outer diameter of approx. 5 mm and an inner diameter of approx. 3 mm.

A rotating nozzle pipe generates particularly low vibrations when the length ratio of main, transitory and nozzle section is 68:26:7. Using the diameters given above, this results in a particularly stable, functioning, long-lived and low-vibration variant, when the length of the main section up to where the bend starts is approx. 68 mm, the length of the transitory section is approx. 26 mm, and the length of the transitory section with nozzle section is approx. 33 mm.

Vibration can be minimized further by arranging the outlet side bearing on the main section of the nozzle pipe in close vicinity to the bend.

The invention also covers a nozzle pipe assembly for cleaning equipment operated with compressed air, the nozzle pipe of which features the sections and dimensions given above, and whose outlet side bearing is arranged as specified above. In addition to the nozzle pipe, the nozzle assembly features the mentioned outlet side bearing, a spacer and an inlet side bearing all arranged on the main section and making axial contact with each other.

The drawings below illustrate a built prototype of the invention.

The individual figures in the drawing show.

Figure 1:
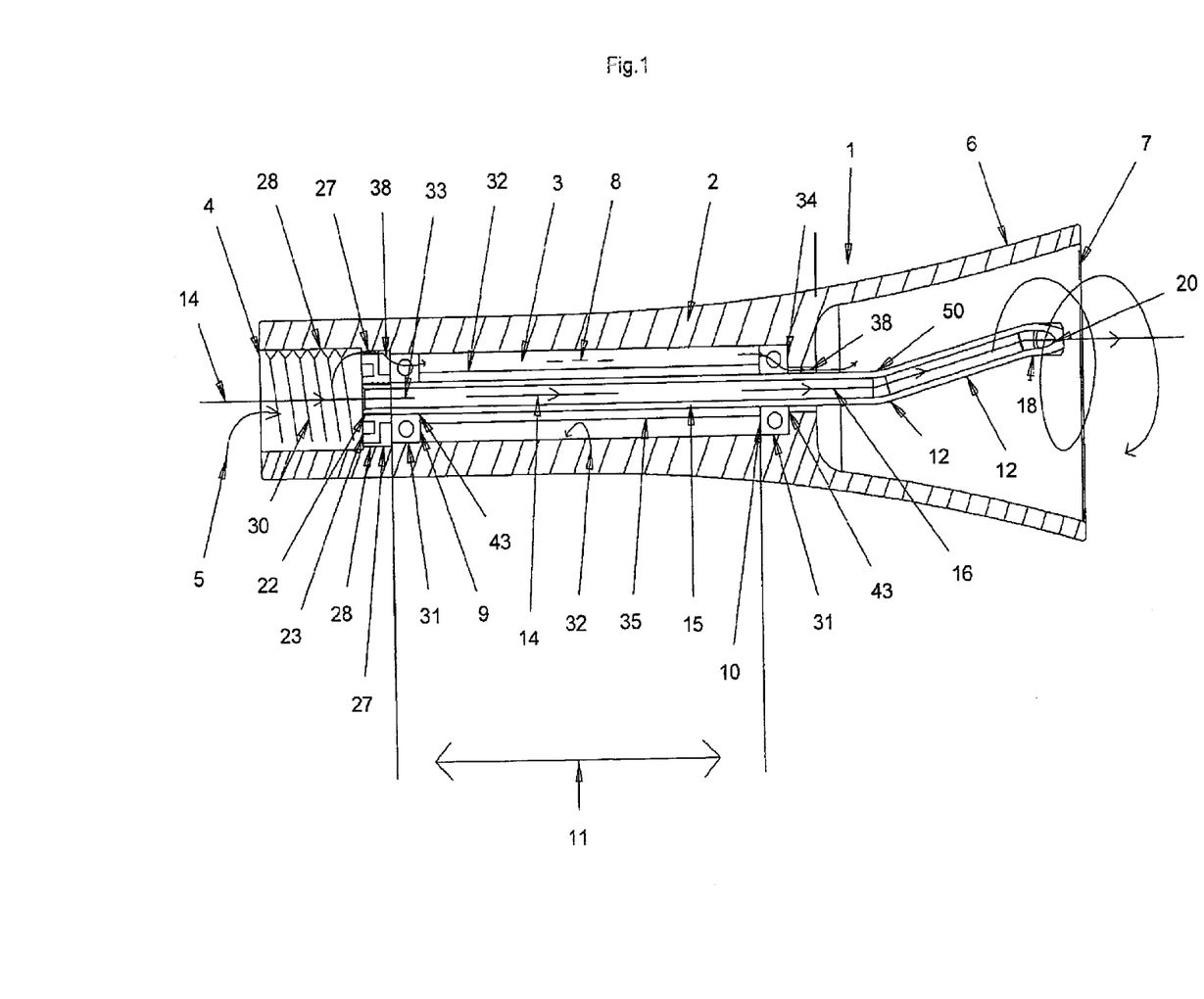
FIG. 1: a partial section of an atomizing nozzle assembly according to the present invention, including a nozzle pipe assembly according to the present invention.

As can be seen best in FIG. 1, atomizing nozzle assembly 1 described in this invention comprises a nozzle housing 2, which features a tubular housing section 3 and a funnel-shaped, widened outlet opening 6. At an inlet end 4 of the tubular housing section 3, an inlet orifice 5 through which compressed air or another fluid can enter is provided. Outlet opening 6 features an outlet orifice 7, through which the whirled fluid 54 can exit.

The tubular housing section 3 features a cylindrical inner space 8, on whose inner wall 32 an inlet side bearing 9 and an outlet side bearing 10 with their respective outer races 31 make radial contact and are kept in position. Inner races 43 of ball bearings 9, 10 rotate in relation to nozzle housing 2 and comprise a main section 15 of a nozzle pipe 12, which extends through the two ball bearings 9, 10. A spacer 35 shaped like a sleeve enclosing main section 15 of nozzle pipe 12 and at both its axial ends making contact with inner races 43 of bearings 9, 10, which thus are positioned at axial distance 11.

Nozzle pipe 12 features in addition to its main section 15 a transitory section 17, having an angle 44 of von 160° (see FIG. 5) in relation to main section 15. Transitory section 17 extends into an also bent nozzle section 18, whose free end 19 features a nozzle orifice 20. On a male thread 21 (FIG. 5) of one inlet end 13 of the nozzle pipe 12, a female thread 22 of a stop element 23 is screwed. The outer diameter 45 of nozzle pipe 12 is 5 mm, the inner diameter 46 is 3 mm.

Fluid 14 enters nozzle pipe 12 through the inlet end 13 and continues flowing until fluid 14 exits at nozzle orifice 20 and due to backstroke causes nozzle pipe 12 to rotate around rotary axis 16. This transforms fluid 14 into a whirled fluid 54, which exits at outlet orifice 7 of the nozzle housing 2.

Figure 5:
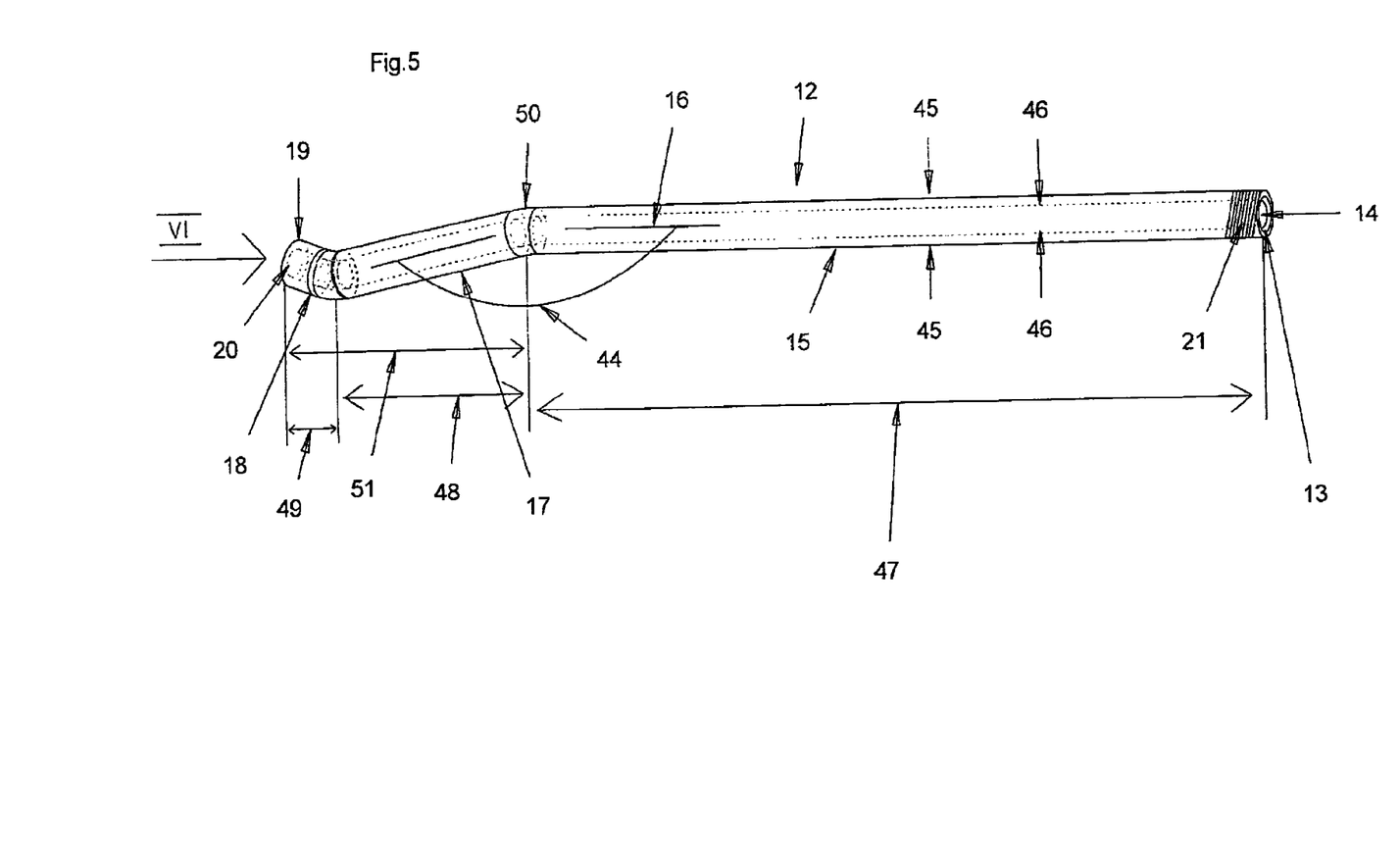
FIG. 5: a lateral view of a nozzle pipe.
Figure 6:
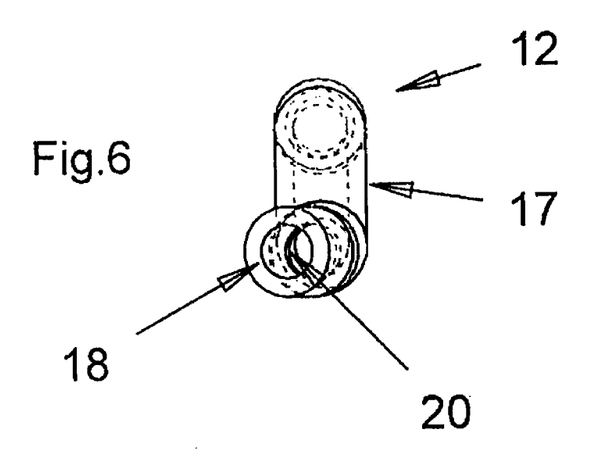
FIG. 6: a view of the nozzle pipe from direction VI in FIG. 5.

The dimensions of sections 15, 17, 18 of the nozzle pipe 12 are vital for an operation of the atomizing nozzle assembly 1 with as little vibration as possible. Optimal is a length 47 of 68 mm for main section 15, a length 48 of 26 mm for transitory section 17, and a length 49 of 7 mm for nozzle section 18. It is advantageous to also maintain the ratio 68:26:33 for length 47 of main section 15, length 48 of transitory section to length 51 of transitory section 17 and nozzle section 18 for other scale factors.

Figure 2:
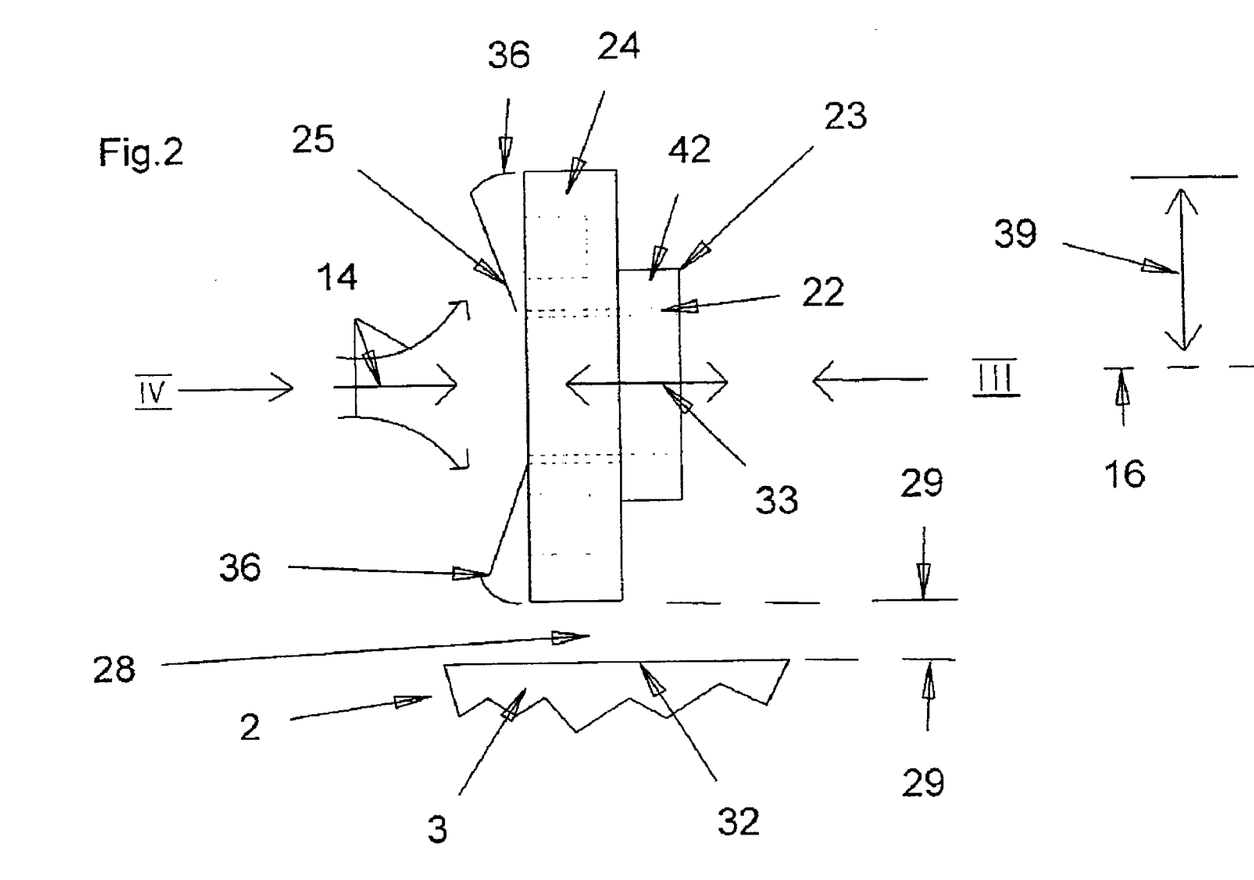
FIG. 2: a zoomed lateral view of a modified variant of a stop element.
Figure 3:
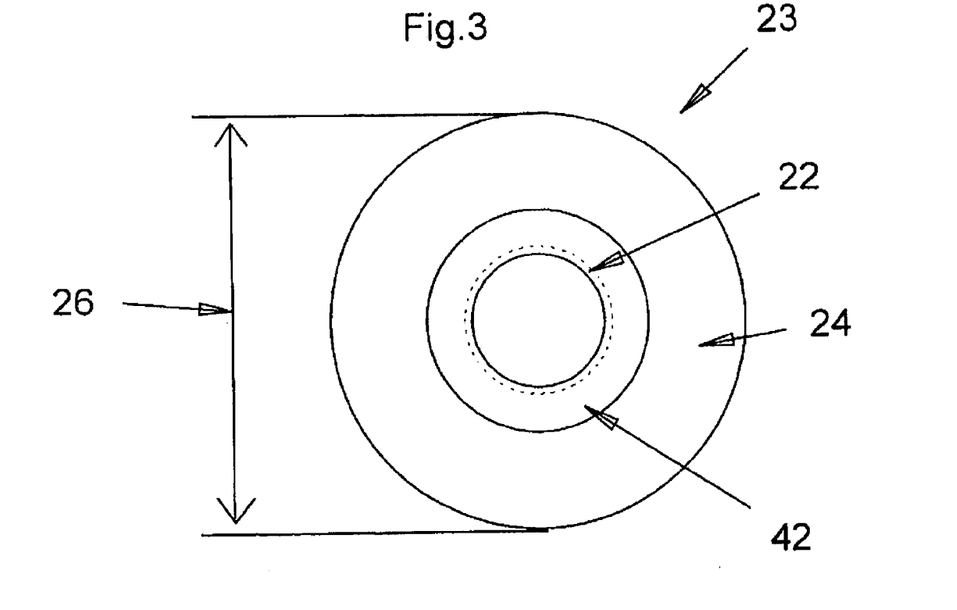
FIG. 3: the rear view of the stop element from direction III in FIG. 2.
Figure 4:
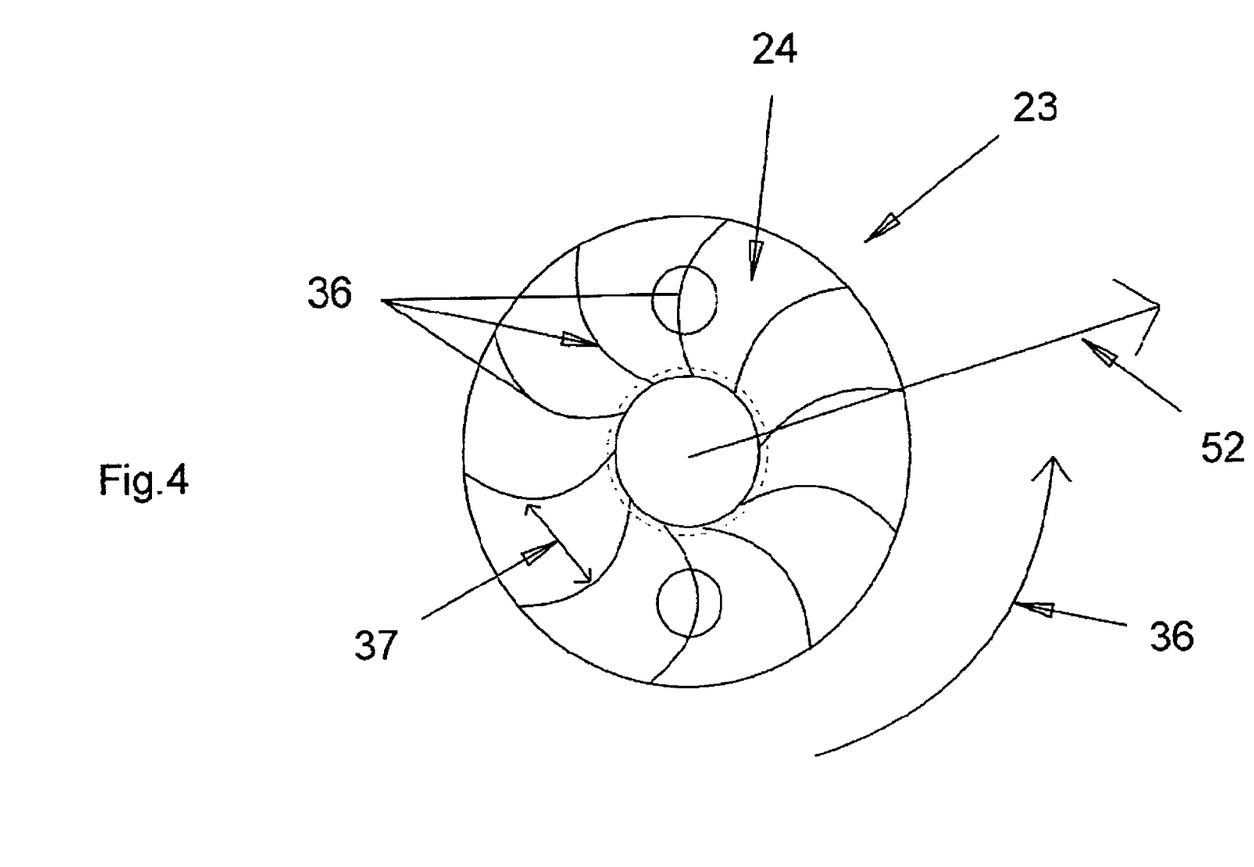
FIG. 4: the front view of the stop element acc. to IV in FIG. 2.

FIGS. 2 thru 4 show an enlarged view of stop element 23 from different viewing directions. It comprises a disc section 24 radially extending outward, and an inlet side 25 where fluid 14 enters. The outer diameter 26 of disc section 24 is 16 mm. This makes it slightly smaller than the inner diameter 27 of the tubular housing section 3 in the axial area of stop element 23. As a result, there is an annular gap 28 between the radial outer edge of stop element 23 and the inner wall 32 of nozzle housing 2 with a gap width 29 of 2 mm (see also FIG. 2). As can be seen best in FIG. 1, a secondary flow path 38 of fluid 14 can pass through annular gap 28 and via inlet side bearing 9 reach the inner space 8 from where secondary flow path 38 reaches the area of output opening 6 via outlet side bearing 10. In this way, secondary flow path 38 can detach small dirt particles that have collected in bearings 9, 10 and remove these from bearings 9, 10, thus increasing the smooth operation and service life of bearings 9, 10.

At the inlet end 4 of tubular housing section 3 of nozzle housing 2, a female thread 30 has been provided, which is intended for fastening nozzle housing 2 to a thread (not shown) of a cleaning equipment, which supplies compressed air or cleaning fluid droplets mixed with compressed air or another pressurized fluid 14.

On its inlet side 25, disc section 24 of stop element 23 is equipped with blades 36 exposed to the fluid flow 14. As can be seen best in FIG. 4, blades 36 on disc section 24 are arranged in direction of rotation 41 at identical angular distances 37 to each other and spirally bent in radial direction 52. As can be seen best in FIG. 2, the extension of blades 36 increases in axial direction 33 with increasing distance 39 from the axis of rotation 16.

Stop element 23 also features a tubular pipe section 42 extending in axial direction 33, axially extending around nozzle pipe 12 and making contact with inner race 43 of inlet side bearing 9 in axial direction 33. Female thread 22 extends through disc section 24 and pipe section 42.

In axial direction 33, outlet end bearing 10 makes radial contact to a shoulder 34 protruding from the inner wall 32 of nozzle housing 2 towards the inside, forming a ring-shaped structure in inner space 8. When fluid 14 exerts a high pressure against inlet side 25 of disc section 24 of stop element 23, the resulting force is absorbed via the face end of pipe section 42 to inner race 43 of inlet side bearing 9, from here in axial direction 33 to spacer 35 and from spacer 35 to inner race 43 and from here via the balls to outer race 31 of outlet side bearing 10, and finally the axial shoulder of nozzle housing 2, with which outer race 31 of outlet side ball bearing 10 has axial contact.

The arrangement of outlet side bearing 10 on main section 15 of nozzle pipe 12 near bend 50 between main section 15 and transitory section 17 results in a relatively low-vibration bearing increasing the service life of nozzle pipe 12 and in particular of bearings 9, 10.

Atomizing nozzle assembly 1 described in the present invention can be easily connected to the fluid supply of the cleaning equipment, in particular to a compressed air pistol handle with reservoir for cleaning agent, by connecting nozzle housing 2 using female thread 30 with the other housing parts. Other parts need not be connected. This facilitates assembly and reduces the risk of maloperation. Of course, atomizing nozzle assembly 1 described in the present invention is also suited for a variant not shown where the cleaning fluid is supplied connected to the other equipment part via a thin nylon hose, which must be inserted into nozzle pipe 12 from the inlet side 13 when connecting the atomizing nozzle assembly and whose free end where the cleaning fluid exits is located in the area of nozzle opening 20 in case of an atomizing nozzle assembly 1 assembled ready for use.

Atomizing nozzle assembly 1 described in the present invention can also be easily mounted because a nozzle pipe assembly can be preassembled, and this preassembled unit can be inserted into nozzle housing 2 through inlet opening 5 easily until outlet side bearing 10 makes contact with axial shoulder 34 of nozzle housing 2 and both bearings 9, 10 are held in nozzle housing 2 by friction with inner wall 32. Nozzle housing 2 is preferably made as a single injection molding plastic part. Other parts that can be preassembled as nozzle assembly are preferably made of metal, in particular steel, stainless steel, aluminum or a suitable alloy. Nozzle pipe 12 can also be made of particularly durable plastic or carbon fiber for extremely demanding permanent operation.

The preassembled nozzle assembly can be easily be manufactured as follows: first cut a thread on nozzle pipe 12, bend it, then press on outlet side bearing 10 in the desired axial position and finally mount spacer 35 and outlet side bearing 10 and screw on stop element 23.

LIST OF REFERENCE NUMERALS

1 Atomizing nozzle assembly
2 Nozzle housing
3 Tubular housing section
4 Inlet end
5 Inlet orifice
6 Outlet section
7 Outlet opening
8 Inner space
9 Inlet side bearing
10 Outlet side bearing
11 Axial offset
12 Nozzle pipe
13 Inlet end
14 Fluid
15 Main section
16 Axis of rotation
17 Transitory section
18 Nozzle section
19 Free end
20 Nozzle opening
21 Male thread
22 Female thread
23 Stop element
24 Disc section
25 Inlet side
26 Outer diameter
27 Inner diameter
28 Annular gap
29 Gap width
30 Female thread
31 Outer races
32 Inner wall
33 Axial direction
34 Axial shoulder
35 Spacer
36 Blade
37 Angular distances
38 Secondary flow path
39 Distance
40 Whirled fluid
41 Direction of rotation
42 Pipe section
43 Inner race
44 Angle
45 Outer diameter
46 Inner diameter
47 Length of main section
48 Length of transitory section
49 Length of nozzle section
50 Bend
51 Length
52 Radial direction

The invention claimed is:

1. Atomizing nozzle assembly for pneumatically operated cleaning equipment with a nozzle body including a substantially tubular housing section having an inlet section with an opening configured to be fastened to the cleaning equipment, and a substantially funnel-shaped outlet section having an outlet opening, the assembly further including:

a bearing near each of the inlet and outlet sections, the bearings at an axial offset to one another;

a rotatable nozzle pipe having an inlet where pressurized fluid can enter, a main section of the nozzle pipe extending through the bearings, followed, in the area of the outlet section of the nozzle housing, by a transitory section of pipe angled in relation to the main section of pipe, the transitory section leading into a nozzle section whose free end includes a nozzle opening from which pressurized fluid can exit; and a stop element in the area of the inlet section, the stop element having a substantially annular disc section radially protruding outwardly from the nozzle pipe such that there is a secondary flow path for pressurized fluid from the inlet opening to the outlet opening through an annular gap formed between the annular disc section and the tubular nozzle housing.

2. Atomizing nozzle assembly according to claim 1, wherein the stop element includes a pipe section forming a sleeve around the nozzle pipe and making contact with the inner race of the bearing near the inlet section.

3. Atomizing nozzle assembly according to claim 1, wherein fluid travelling along the secondary flow path travels through the bearings near the inlet and the outlet such that a bearing cleaning effect is provided.

4. Atomizing nozzle assembly according to claim 1, wherein the annular gap including a gap width of about 2 mm and that the outer diameter of the disc section is about 16 mm.

5. Atomizing nozzle assembly according to claim 1, wherein the nozzle pipe in the area of its inlet end includes a male thread, to which the stop element with female thread is screwed.

6. Atomizing nozzle assembly according to claim 1, wherein the nozzle housing section includes, at the inlet section, a female thread for fastening to cleaning equipment.

7. Atomizing nozzle assembly according to claim 1, wherein the peripheral surface of the radial outer races of both bearings have contact with a cylindrical inner wall of the tubular housing section of the nozzle housing.

8. Atomizing nozzle assembly according to claim 1, wherein the outlet side bearing makes contact with a shoulder radially protruding inward from the inner wall of the nozzle housing, and a spacer enclosing the nozzle pipe is arranged between inlet side bearing and outlet side bearing.

9. Atomizing nozzle assembly according to claim 8, wherein pressurized fluid received through the inlet opening forces the stop element against the inlet side bearing in axial direction, the inlet side bearing being supported by the spacer, the outlet side bearing and ultimately by the axial shoulder of the nozzle housing.

10. Atomizing nozzle assembly according to claim 1, wherein the stop element includes blades arranged on the side of the of the annular disc section facing the inlet opening and the expansion of blades increases in axial direction with increasing distance from the axis of rotation of the nozzle pipe.

11. Atomizing nozzle assembly according to claim 10, wherein the blades are arranged in the direction of rotation of the nozzle pipe at identical angular distances to each other and spirally bent in radial direction.

12. Atomizing nozzle assembly according to claim 1, wherein the transitory section of the nozzle pipe in relation to the axis of rotation of the main section features an angle of about 160° and wherein the nozzle section of the nozzle pipe is angled in relation to the transitory section and also to the axis of rotation.

13. Atomizing nozzle assembly according to claim 1 wherein the nozzle pipe has an outer diameter of approx. 5 mm and an inner diameter of approx. 3 mm.

14. Atomizing nozzle assembly according to claim 1, wherein the lengths of main section to transitory section to the nozzle section of nozzle pipe have a ratio of 68 to 26 to 7.

15. Atomizing nozzle assembly according to claim 14, wherein length of main section up to the beginning of the bend to transitory section is about 68 mm, the length of transitory section is about 26 mm, and the length of transitory section together with nozzle section is about 33 mm, and wherein the outlet side bearing on main section of the nozzle pipe is located near the bend.

16. A nozzle assembly for pneumatically operated cleaning equipment including:
   a substantially tubular housing having an inlet for connecting to the cleaning equipment and an outlet;
   an inlet side bearing and an outlet side bearing positioned within the housing;
   a nozzle pipe extending through the bearings and thereby rotatable with respect to the housing; and
   a stop element mounted to the nozzle pipe including a substantially annular disc section that extends radially outward from the nozzle pipe, the stop element positioned between the inlet and the inlet side bearing,
   wherein a first fluid flow path from the inlet to the outlet is provided through the nozzle pipe and a second fluid flow path from the inlet to the outlet is provided through an annular gap between the stop element and the tubular housing.

17. Atomizing nozzle assembly for pneumatically operated cleaning equipment with a nozzle body comprising a basically tubular housing section with an inlet end with inlet opening to be fastened to the cleaning equipment, ending into a funnel-shaped extension with an outlet section and outlet opening at the opposite side, with a bearing each at the inlet and outlet side at an axial offset to each other for a rotating nozzle pipe having an inlet end where pressurized fluid, comprising compressed air or a mixture of compressed air and fluid droplets, can enter; a main section of the nozzle pipe starting from the inlet end and basically reaching through the bearings in a straight manner followed, in the area of the exit section of the nozzle housing, by an transitory section angled in relation to the axis of rotation of the nozzle pipe, which leads into a nozzle section whose free end features a nozzle opening from which the fluid exits, with the nozzle pipe having a stop element in the area of its inlet end basically having an annular disc section radially protruding to the outside, characterized in that the pipe section around the nozzle pipe of the stop element axially touches an inner ring of the bearing at the inlet side and that a secondary flow path of the fluid can flow through an annular gap formed between the disc section and the nozzle housing and via the bearing at the inlet side into the inner space and further through the bearing at the outlet side.

* * * * *